US009196113B2

(12) United States Patent
Robbins et al.

(10) Patent No.: US 9,196,113 B2
(45) Date of Patent: Nov. 24, 2015

(54) WAGERING GAME PREFERENCE SELECTION

(71) Applicant: WMS Gaming, Inc., Waukegan, IL (US)

(72) Inventors: Richard B. Robbins, Glenview, IL (US); Brian K Danilo, Chicago, IL (US); Andrew C. Guinn, Chicago, IL (US); Daniel P. Louie, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/801,852

(22) Filed: Mar. 13, 2013

(65) Prior Publication Data

US 2014/0274251 A1 Sep. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ........ *G07F 17/3211* (2013.01); *G07F 17/3209* (2013.01); *G07F 17/3218* (2013.01); *G07F 17/3227* (2013.01); *G07F 17/3251* (2013.01); *G07F 17/3293* (2013.01); *G07F 17/34* (2013.01)

(58) Field of Classification Search

CPC G07F 13/3227; G07F 13/323; G07F 13/3213
USPC ........................................................ 463/11
See application file for complete search history.

(56) References Cited

U.S. PATENT DOCUMENTS

| | | | | |
|---|---|---|---|---|
| 6,068,552 | A * | 5/2000 | Walker et al. | 463/21 |
| 6,110,041 | A * | 8/2000 | Walker et al. | 463/20 |
| 6,254,483 | B1 | 7/2001 | Acres | |
| 6,342,010 | B1 | 1/2002 | Slifer | |
| 6,350,199 | B1 | 2/2002 | Williams et al. | |
| 6,628,939 | B2 | 9/2003 | Paulsen | |
| 6,731,313 | B1 | 5/2004 | Kaminkow | |
| 6,769,986 | B2 | 8/2004 | Vancura | |
| 7,040,987 | B2 | 5/2006 | Walker et al. | |
| 7,169,052 | B2 * | 1/2007 | Beaulieu et al. | 463/43 |
| 7,526,736 | B2 | 4/2009 | Kaminkow et al. | |
| 7,618,319 | B2 | 11/2009 | Casey et al. | |
| 7,722,453 | B2 | 5/2010 | Lark et al. | |
| 7,753,789 | B2 | 7/2010 | Walker et al. | |
| 7,867,085 | B2 | 1/2011 | Pryzby et al. | |
| 7,883,413 | B2 | 2/2011 | Paulsen | |

(Continued)

OTHER PUBLICATIONS

"AU Application No. 2014200974 Examination Report", Nov. 1, 2014, 2 pages.

*Primary Examiner* — Kevin Y Kim
(74) *Attorney, Agent, or Firm* — DeLizio Law, PLLC

(57) ABSTRACT

A wagering game system and its operations are described herein. In some embodiments, the operations can include presenting, at a wagering game machine, a wagering game including a wagering game element. The operations can include presenting a graphical indicium in association with the wagering game element. The operations can include detecting player selection of the graphical indicium, wherein the player selection of the graphical indicium indicates player liking for the wagering game element. The operations can include modifying the wagering game based on the player liking for the wagering game element.

25 Claims, 11 Drawing Sheets

(56) References Cited

U.S. PATENT DOCUMENTS

| | | | | |
|---|---|---|---|---|
| 7,918,738 | B2 | 4/2011 | Paulsen | |
| 8,221,245 | B2 | 7/2012 | Walker et al. | |
| 8,235,811 | B2 | 8/2012 | Joshi et al. | |
| 8,282,465 | B2 | 10/2012 | Giobbi | |
| 2004/0162140 | A1* | 8/2004 | Blanco | 463/35 |
| 2004/0166940 | A1 | 8/2004 | Rothschild | |
| 2004/0180712 | A1 | 9/2004 | Forman et al. | |
| 2004/0219968 | A1 | 11/2004 | Fiden et al. | |
| 2005/0043092 | A1 | 2/2005 | Gauselmann | |
| 2005/0170890 | A1 | 8/2005 | Rowe et al. | |
| 2005/0277469 | A1 | 12/2005 | Pryzby et al. | |
| 2006/0035707 | A1* | 2/2006 | Nguyen et al. | 463/29 |
| 2006/0058091 | A1* | 3/2006 | Crawford et al. | 463/13 |
| 2008/0076546 | A1* | 3/2008 | Moyle et al. | 463/29 |
| 2010/0317433 | A1 | 12/2010 | Ansari et al. | |
| 2010/0317435 | A1 | 12/2010 | Velu | |
| 2011/0009181 | A1* | 1/2011 | Speer et al. | 463/20 |
| 2011/0092288 | A1 | 4/2011 | Pryzby et al. | |
| 2012/0108309 | A1 | 5/2012 | Aoki et al. | |

* cited by examiner

WAGERING GAME PREFERENCE SELECTION

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to wagering game systems, and more particularly to wagering game systems including player preference selection.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example operations performed by some embodiments of the inventive subject matter. The third section describes an example wagering game machine and the fourth section describes example wagering game networks. The fifth section presents some general comments.

Introduction

This section provides an introduction to some embodiments of the invention. Some wagering games allow players to select customization options before gameplay. For example, some games allow players to choose wagering game type, color theme for the wagering game, game pieces (e.g., slot reels), etc. However, some embodiments of the inventive subject matter allow players to indicate a liking for certain aspects of a wagering game during gameplay (i.e., while the player is playing the wagering game). For example, while playing a video slot game, the game allows a player to select a slot reel symbol (e.g., a "7" or a "bar") used in the game. In some embodiments, selection of the slot reel symbol (or other wagering game element) indicates that the player likes the slot reel symbol (or other wagering game element). In other embodiments, selection of a wagering game element may prompt presentation of a menu through which the player can indicate a relative like or dislike of the wagering game element. Furthermore, in some embodiments, the player's preferences (i.e., likes and dislikes) may be recorded and used to customize the wagering game as the player plays.

Figure 1A:
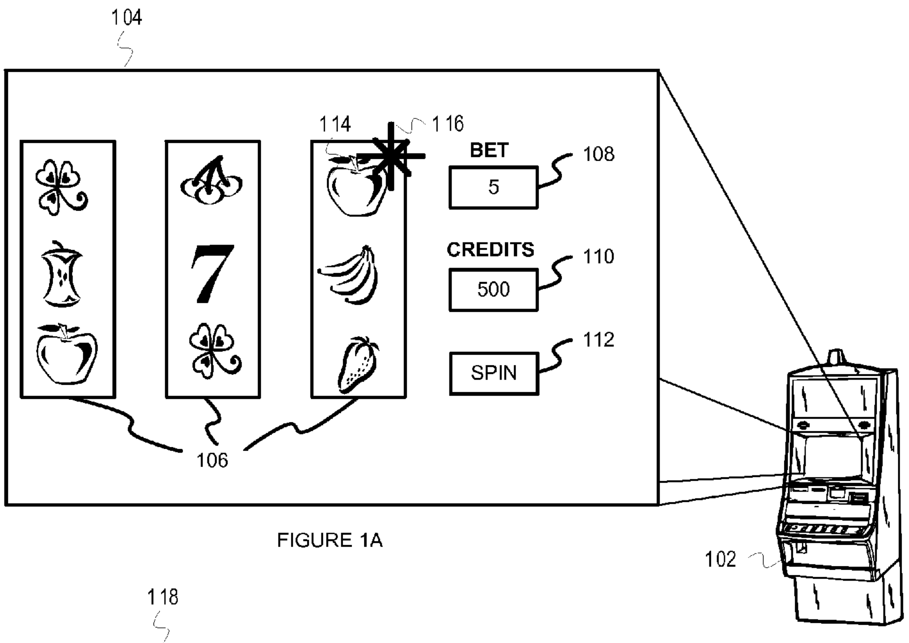
FIG. 1*a* depicts a wagering game machine 102 presenting a wagering game on its display device 104.

FIG. 1*a* depicts a wagering game machine 102 presenting a wagering game on its display device 104. The wagering game depicted in FIG. 1*a* is a video slot game. The wagering game includes many wagering game elements, including wagering game elements 106-114. For example, as depicted in FIG. 1*a*, the wagering game includes wagering game elements such as slot reels 106, bet meter 108, credit meter 110, spin button 112, and slot reel symbol 114. Other wagering game elements may be included that are not specifically described (e.g. color theme, wagering game graphics, etc.). Additionally, the wagering game includes indicium 116 indicating that a wagering game element may be selected to indicate the player's like and/or dislike for the element. In some embodiments, all selectable wagering game elements may have associated indicia. In other embodiments, no indicia may be present, and every wagering game element may be selectable.

Figure 1B:
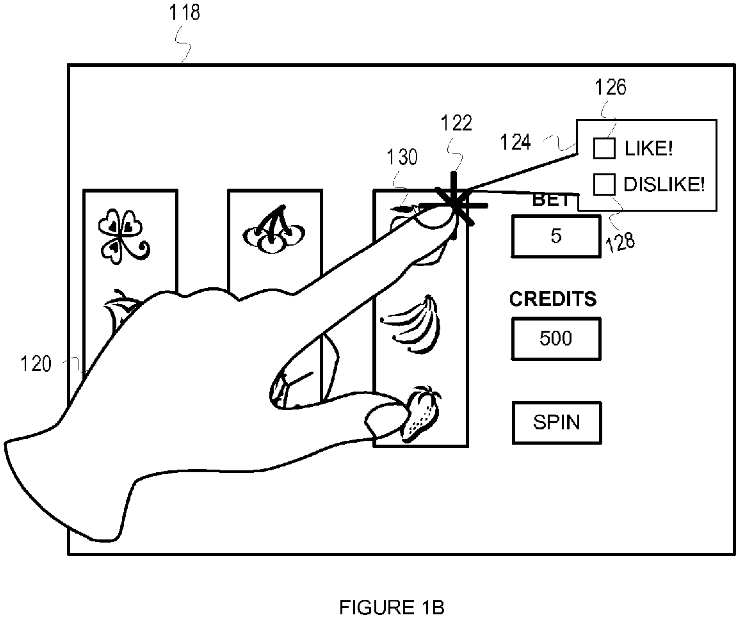
FIG. 1*b* depicts a player indicating a preference for a wagering game element 130 presented on the wagering game machine's display device 118.

FIG. 1*b* depicts a player indicating a preference for a wagering game element 130 presented on the wagering game machine's display device 118. As depicted in FIG. 1*b*, the player is selecting an indicium 122 associated with slot reel symbol 130, by touching the indicium 122 with their left hand 120. When the player selects the indicium 122, the wagering game machine presents a preference menu 124. The player can indicate whether they like or dislike the slot reel element 130 using preference menu 124. For example, the player could select the "like" selection box 126 to indicate that they like the slot reel symbol 130. Alternatively, the player could select the "dislike" selection box 128 to indicate that they do not like the slot reel symbol 130. In some embodiments, the wagering game machine may not present a preference menu. In such embodiments, the player need only touch the indicium 122 to indicate a liking for the associated game element. Alternatively, instead of presenting indicia, selection of game elements may indicate that the player likes the selected wagering game element.

Figure 2:
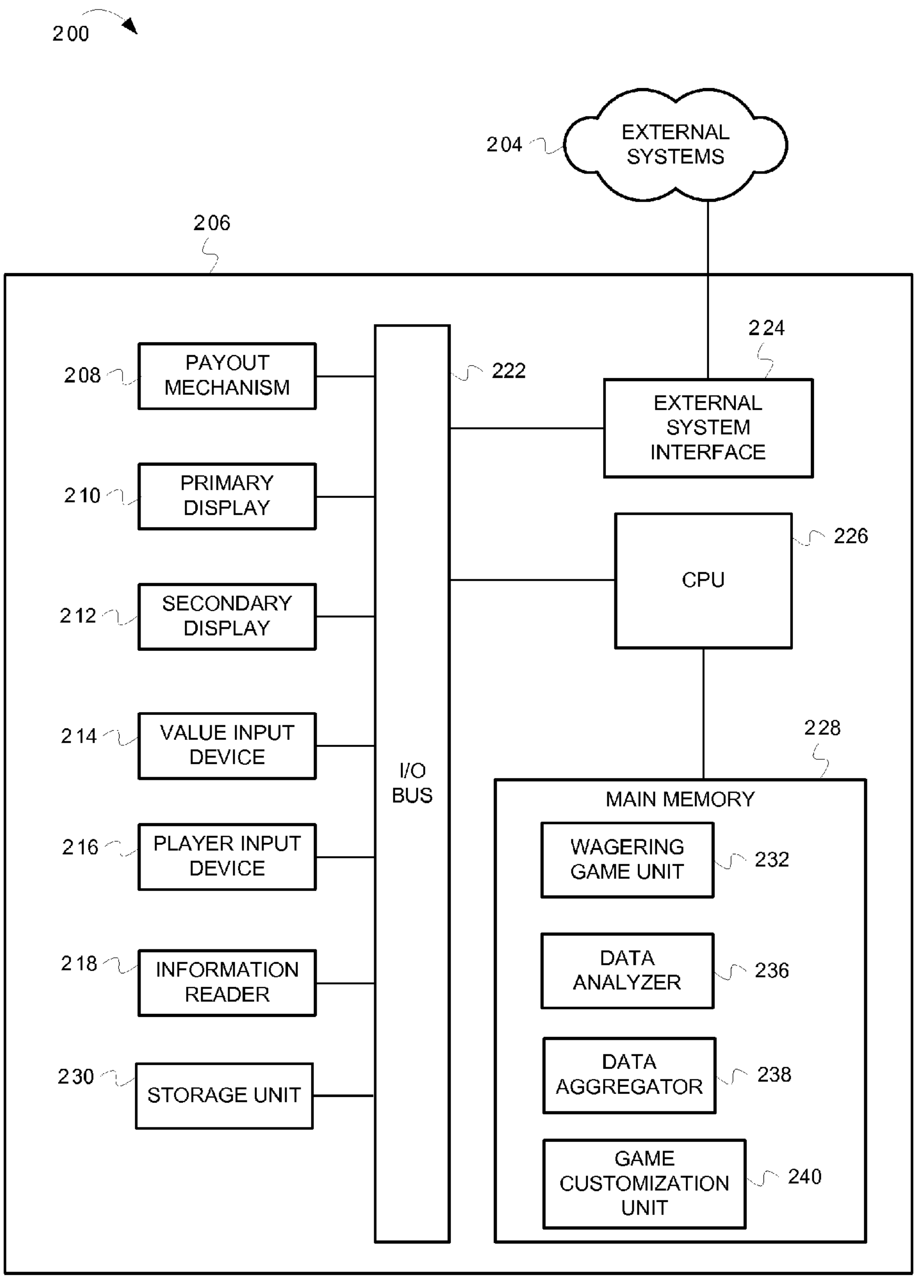
FIG. 2 is a block diagram illustrating a wagering game machine architecture, according to example embodiments of the invention.

While FIGS. 1*a* and 1*b* depict a wagering game machine display and a player indicating a preference selection, FIG. 2 depicts a sample wagering game machine architecture.

FIG. 2 is a block diagram illustrating a wagering game machine architecture, according to example embodiments of the invention. As shown in FIG. 2, the wagering game machine architecture 200 includes a wagering game machine 206, which includes a central processing unit (CPU) 226 connected to main memory 228. The CPU 226 can include any suitable processor, such as an Intel®Pentium processor, Intel® Core 2 Duo processor, AMD Opteron™ processor, or UltraSPARC processor. The main memory 228 includes a wagering game unit 232, a data analyzer 236, a data aggregator 238, and a game customization unit 240. In one embodiment, the wagering game unit 232 can present wagering games, such as video poker, video black jack, video slots, video lottery, etc., in whole or part.

The data analyzer 236 can process player inputs including selection of indicia associated with game elements (see discussion above), and player input explicitly indicating a like and/or dislike for particular game elements. Based on the player inputs, the data analyzer 236 can determine the player's preference for certain wagering game elements. The data aggregator 238 can aggregate the player preferences and other related player input. For example, the data aggregator 238 can compile player preferences (e.g., as indicated by selection of indicia associated with game elements) from a single wagering game session, or can compile player preferences from several players and/or several wagering game sessions. The game customization unit 240 can, based on the player preferences, customize wagering games.

The CPU 226 is also connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Figure 3:
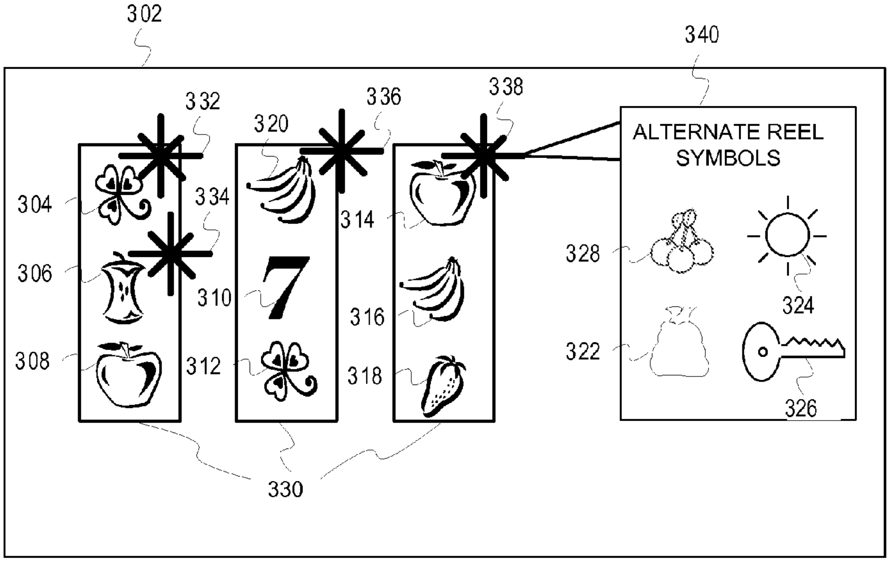
FIG. 3 depicts a menu 340 for a player to select an alternate reel symbol 322-328.
Figure 4:
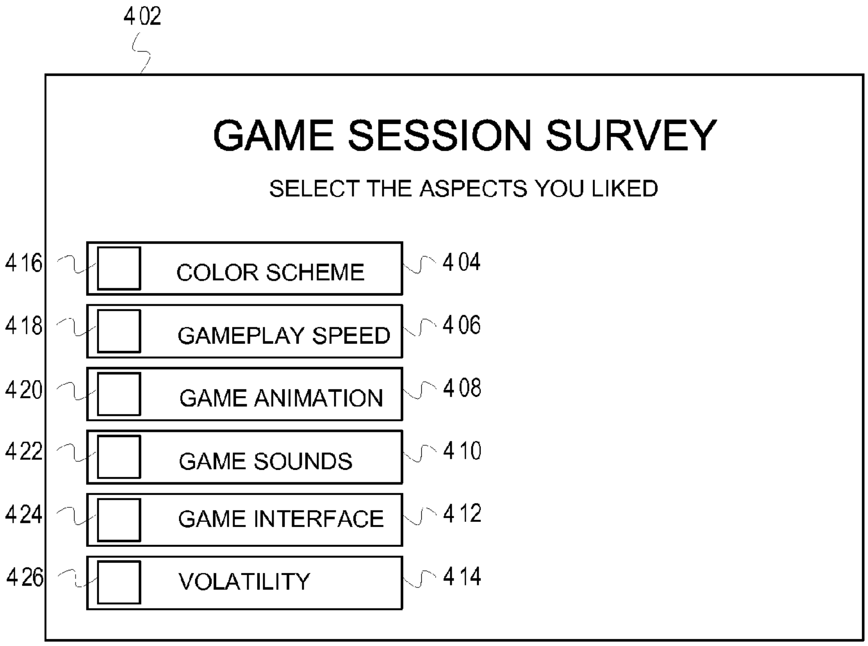
FIG. 4 depicts a wagering game session survey in which a player can indicate their preferences.

This discussion continues with a description of FIGS. 3-5, which show how embodiments facilitate player preference selection.

FIG. 3 depicts a menu 340 for a player to select an alternate reel symbol 322-328 in a slots game. In some embodiments, in addition to being able to indicate a like or dislike of a wagering game element, the player may be able to replace a wagering game element that they dislike with a wagering game element they prefer. For example, the player may wish to replace one slot reel symbol with another.

In FIG. 3, a wagering game machine is presenting a video slot game on its display 302. The video slot game ("wagering game") includes slot reels 330 and slot reel symbols 304-320. For example, slot reel symbol 304 is a three-leaf clover and slot reel symbol 306 is an apple core. Slot reel symbols 304, 306, 320, and 314 have corresponding indicia 332, 334, 336, and 338, indicating that each slot reel symbol 304, 306, 320, and 314 can be selected. Although FIG. 3 does not depict each slot reel symbol having a corresponding indicium, in some embodiments, all slot reel symbols as well as other wagering game elements may have corresponding indicia. In FIG. 3, slot reel element 314 has been selected, indicating that the player wishes to replace slot reel symbol 314 (an apple) with an alternate slot reel symbol. Upon selection of slot reel element 314, the wagering game machine presents an alternate reel symbol menu 340. Alternate reel symbol menu 340 contains alternate reel symbols 322-328 from which the player can select. The player may then select an alternate slot reel symbol 322-328 to replace slot reel symbol 314 in the wagering game. In some embodiments, the player may be able to replace existing wagering game elements with other alternate wagering game elements. For example, the player may replace a credit meter of one style with a credit meter of another style through use of a similar menu. Additionally, a player may be able to replace one or more sound effects associated with the wagering game with alternate sound effects. In some embodiments, the player may be able to replace any wagering game element with an alternative wagering game element. Additionally, in some embodiments, the player may be able to design their own wagering game element and substitute it for an existing wagering game element. In some instances, after detecting a player's dislike for a game element, the system (not the player) may select a replacement game element.

While FIG. 3 depicts player preference selection during the wagering game session, FIG. 4 depicts player preference selection at the end of a wagering game session.

FIG. 4 depicts a wagering game session survey in which a player can indicate their preferences (e.g., likes and dislikes). In some embodiments, the wagering game machine may present a survey on its display 402 after a predetermined number of rounds of the wagering game, or at the end of a wagering game session. In a first embodiment, for example, the wagering game machine may present a survey after the player has played three rounds of the wagering game. Upon presentation of the survey, the player can indicate the aspects of the wagering game that they liked. In some embodiments, the survey may comprise a list of wagering game aspects from which the user can select. For example, the user may indicate that they liked the color scheme of the wagering game by selecting box 416 corresponding to the "color scheme" block 404. The survey in FIG. 4 also has "gameplay speed," "game animation," "game sounds," "game interface," and "volatility" blocks 406-414 and corresponding selection boxes 418-426. In some embodiments, the wagering game can be modified based on the player's responses to the survey. For example, if the player did not indicate that they liked the color scheme of the wagering game, the wagering game presented after the initial three round period may have a different color scheme.

In a second embodiment, the wagering game machine may present the survey at the end of the wagering game session. In such embodiments, the wagering game machine may either store or transmit the player's responses to the survey. The player's responses may be stored and associated with the player's player account. In such embodiments, the next time the player plays the wagering game, it may be modified to conform with the player's preferences as indicated by the survey. Additionally, responses from several players may be aggregated in order to modify the wagering game based on common preferences or other criteria (see Discussion of FIG. 9 for greater detail).

Figure 5A:
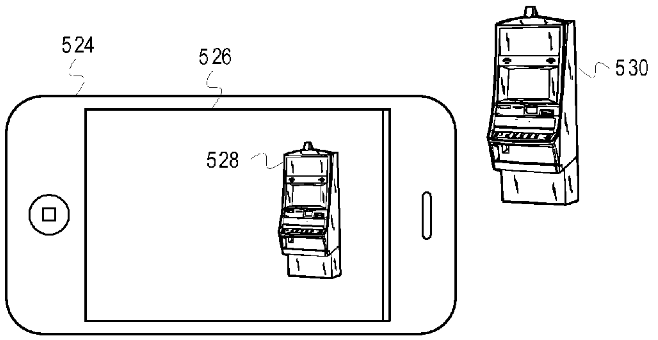
FIG. 5*a* depicts a mobile device 524 presenting a wagering game machine 530 on its display device 526.
Figure 5B:
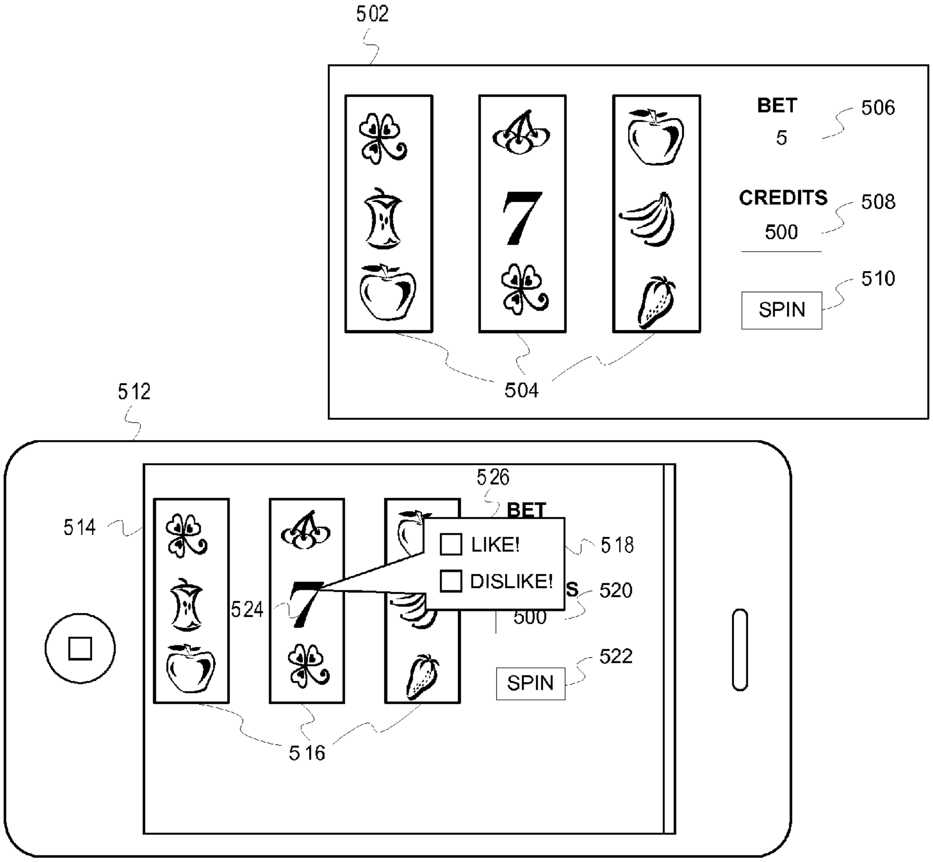
FIG. 5*b* depicts a mobile device 512 presenting a wagering game machine display 502 on its display device 514.

While FIG. 3 and FIG. 4 depict a player indicating preference selection on the wagering game machine, FIGS. 5*a* and 5*b* depict a player indicating preference selection of wagering game elements on a mobile device.

FIG. 5*a* depicts a mobile device 524 presenting a wagering game machine 530 on its display device 526. In FIG. 5*a*, the mobile device 524 is utilizing an image capture device (e.g., a camera) to capture the surrounding area (e.g. a casino floor area). In some embodiments, the mobile device 524 can present a live feed of the surrounding area as captured by the image capture device. As depicted, the mobile device 524 is presenting an image of the wagering game machine 528 on its display device 526.

FIG. 5*b* depicts a mobile device 512 presenting a wagering game machine display 502 on its display device 514. Unlike FIG. 5*a*, in which the entire wagering game machine is in the image capture device's field of vision, in FIG. 5*b*, only the wagering game machine's display device 502 is in the image capture device's field of vision. Consequently, only what is presented on the wagering game machine's display device 502 is presented on the mobile device 512. As shown, a wagering game is being presented on the wagering game machine's display device 502 and likewise on the mobile device's 512 display device 514. The wagering game comprises wagering game elements 504-510. Likewise, the presentation of the wagering game on the mobile device 512 has corresponding wagering game elements 516-522. As previously discussed, in some embodiments, the player can indicate, by touch or otherwise, wagering game elements that they like or dislike on the wagering game machine. In some embodiments, as now depicted, the player can indicate wagering game elements that they like or dislike by touching or otherwise indicating on the mobile device 512. For example, the player can select slot reel symbol 524 on the mobile device. In some embodiments, upon selection of slot reel symbol 524, the mobile device 512 can present a preference menu 526. The user may then indicate whether they like or dislike slot reel symbol 524 using preference menu 526.

In further embodiments, the player may be able to indicate a like or dislike of more than just a wagering game element using the mobile device. For example, the player may be able to capture an image of a row of restaurants within a casino or hotel. The player may be able to indicate a preference for one or more of the restaurants by selecting the restaurant in the image presented on the mobile device. In some embodiments, a player may be able to indicate a like or dislike of anything that is can be captured by the mobile device's image capture device.

Additionally, the player may be able to indicate a seating preference at a table game in a similar manner. In such embodiments, if the player's preferred seat at a table game is open while the player is in the casino, the player may be alerted that their preferred seat is available. Likewise, if a player's preferred dealer is currently at a table game, the player may be alerted as to this fact.

Figure 6A:
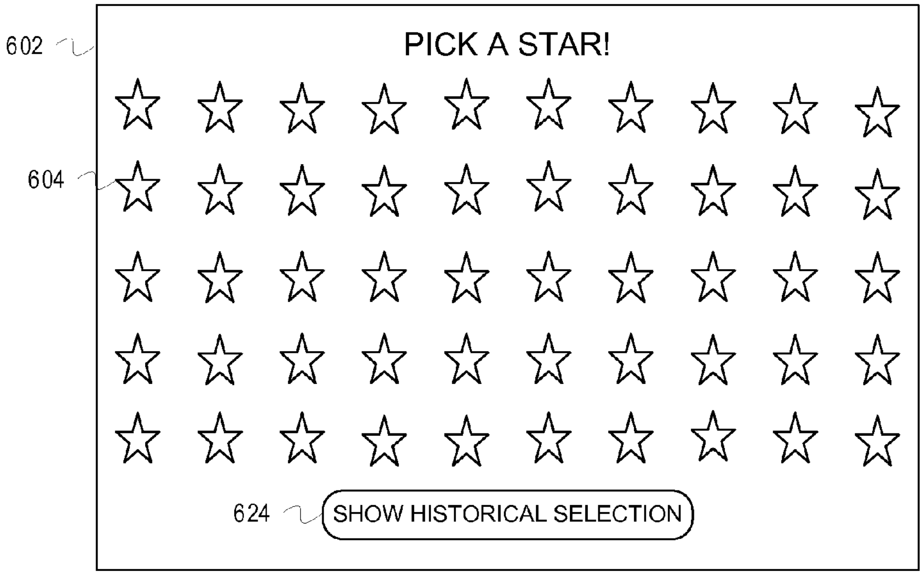
FIG. 6*a* depicts a selection wagering game.
Figure 6B:
FIG. 6*b* depicts a selection wagering game with a "heat map" overlay, indicating the frequency with which each element has been selected.

While FIGS. 3-5 depict player preference selection, FIGS. 6*a* and 6*b* depict a selection wagering game and the presentation of a heat map overlaying the selection wagering game.

FIG. 6*a* depicts a selection wagering game. The selection wagering game depicted in FIGS. 6*a* and 6*b* is of the type where the wagering game machine presents a plurality of icons 604 on its display 602. The player is then prompted to select one of the icons 604. "Hidden" behind one or more of the icons is a reward (e.g., credits, comps, etc.). The player can select one of the icons to reveal what, if anything, is hidden behind the icon. The selection wagering game depicted in FIGS. 6*a* and 6*b* also includes a historical selection button 622, 624. Selection of the historical selection button 624 causes the wagering game machine to present a "heat map" overlay that indicates the frequency with which each icon has been selected (as shown in FIG. 6*b*). In FIG. 6*a*, the historical selection button 624 has not been selected, as indicated by the lack of a heat map over lay.

FIG. 6*b* depicts a selection wagering game with a heat map overlay, indicating the frequency with which each icon has been selected. In FIG. 6*b*, the historical selection button 622 has been selected, as indicated by shading of historical selection button 622. When historical selection button 622 is selected, the wagering game machine presents a heat map overlay. In some embodiments, the heat map overlay may indicate the frequency with which each icon has been selected by other users with the use of color. For example, warmer colors may indicate a greater selection frequency, while cooler colors indicate a lesser selection frequency (e.g., the icon(s) selected with the greatest frequency may be red (or highlighted in red), the icon(s) selected with the second greatest frequency may be orange (or highlighted in orange), the icon with the lowest selection frequency may be blue (or highlighted in blue), etc.). Indication of selection frequency by the use of color however is not required. Any method of indicating selection frequency (visual or otherwise) may be employed. For example, as depicted in FIG. 6*b*, selection frequency is indicated by bolding. The greater the bolding of the icon, the greater the selection frequency. In FIG. 6*b*, icon 608 in the top left corner of wagering game machine display 606 has the greatest bolding, indicating that icon 608 has been historically selected with the greatest frequency. Icon 620, in the second row from the top and the ninth column from the left has the second greatest bolding, indicating that it has been historically selected with the second greatest frequency. Icons 612-618 have the third greatest bolding, indicating that they have been historically selected with the third greatest frequency. Icons 626-634 have the fourth greatest bolding, indicating that they have been historically selected with the fourth greatest frequency. Finally, the remaining icons 610 with no bolding indicate that they have either never been selected, or have been historically selected with a relatively low frequency.

Historical selection data used to create the heat map may include many different groupings of players. For example, in some embodiments, the historical selection data may include the historical selection of all players of the wagering game. In other embodiments, the historical selection data may include only historical selection of all players during a given time period. In other embodiments, the historical selection data may include only the historical selection of social contacts of the current player.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 7:
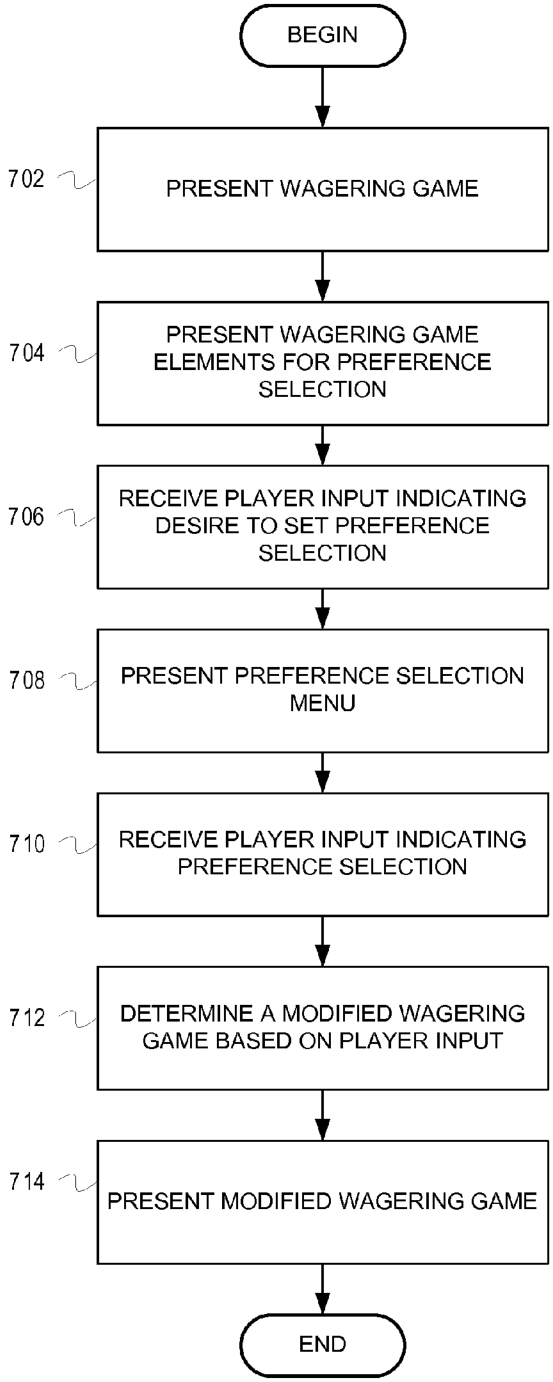
FIG. 7 is a flow diagram illustrating operations for determining a player's wagering game preferences, according to some embodiments of the inventive subject matter.
Figure 8:
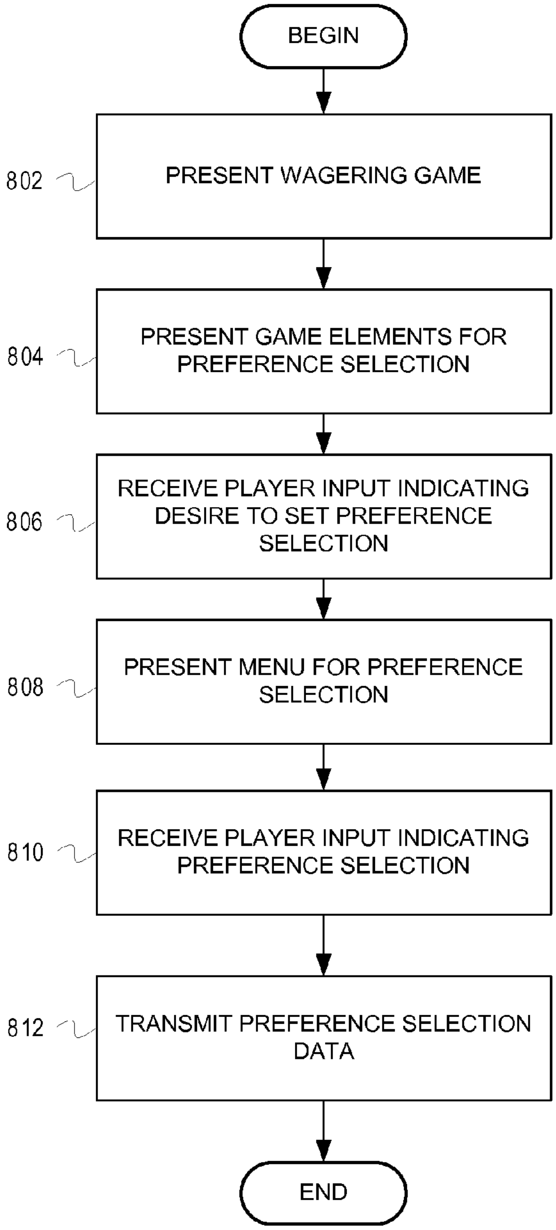
FIG. 8 is a flow diagram illustrating operations for determining a player's wagering game preferences and transmitting the preferences, according to some embodiments of the inventive subject matter.
Figure 9:
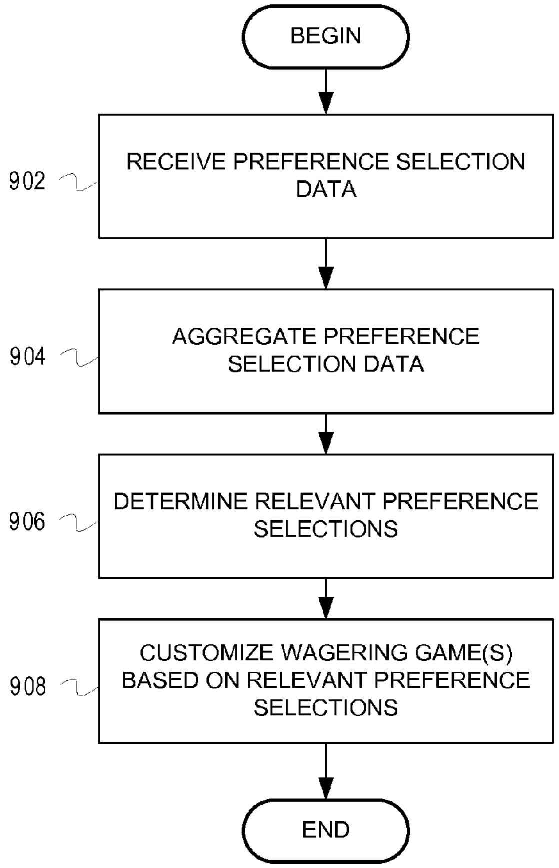
FIG. 9 is a flow diagram illustrating operations for customizing a wagering game based on player preferences, according to some embodiments of the inventive subject matter.

The section will discuss FIGS. 7-9. The discussion of FIGS. 7 and 8 will describe operations for determining player preferences. The discussion of FIG. 9 will describe operations for customizing a wagering game.

FIG. 7 is a flow diagram illustrating operations for determining a player's wagering game preferences, according to some embodiments of the inventive subject matter. The flow begins at block 702.

At block 702, the wagering game machine presents a wagering game. The flow continues at block 704.

At block 704, the wagering game machine presents wagering game elements for preference selection. In some embodiments, every wagering game element is selectable. In other embodiments, only certain wagering game elements are selectable. For example, in a video poker game, only the card type, virtual table, and chip design may be selectable. In some embodiments, the wagering game elements that are selectable may be associated with indicia indicating that they are selectable. For example, the selectable wagering game elements may be associated with a symbol or some other indicium indicating selectability (e.g., blinking or brightly lit elements are selectable). The flow continues at block 706.

At block 706, the wagering game machine receives player input indicating the player's desire to enter a preference selection. In some embodiments, the wagering game machine has a touchscreen. In such embodiments, the player can indicate a desire to provide a preference selection by touching a wagering game element on the touchscreen. Additionally, the player may indicate a desire to enter preferences (e.g., like, dislike, etc.) by touching the touchscreen with a stylus or other instrument. In other embodiments, the wagering game machine may have a button (e.g., hard button or soft button on the touchscreen) that the player can select to indicate a desire to enter preference information. In some embodiments, activation of the button causes indicia or preference menus to appear in the wagering game. In some embodiments, when the button is activated, the wagering game may freeze or a screenshot of the wagering game may be taken in its current state. In some embodiments, the player input can indicate the player's preference, as opposed to indicating a desire to enter a preference selection. For example, player selection of a wagering game element may indicate that the player likes the wagering game element. In such embodiments, blocks 708 and 710 may not be necessary, and the flow would continue at block 712. In embodiments where a preference selection menu is presented, the flow continues at block 708.

At block 708, the wagering game machine presents a preference selection menu. In some embodiments, the preference menu may include only two options—like and dislike. In other embodiments, the preference menu may include a greater resolution or a scale upon which the player can rank their like (or relative dislike) for a wagering game element. For example, the preference menu may include a scale from one to ten, and the player can indicate the relative like or dislike of the wagering game element on the scale from one to ten. In some embodiments, the scale may have fewer than or greater than ten increments. In some embodiments, the preference menu may include only one option. For example, the preference menu may only include an option to like the wagering game element. Additionally, the options for liking or disliking, and the scale, can be dependent on the wagering game element selected. For example, a player may have only the option to like or dislike a slot reel symbol, while the player may be able to indicate on a scale from one to ten their relative like of the gameplay speed. In some embodiments, the presentation of a preference menu is not necessary. In such embodiments, the flow may skip block 708 and proceed directly to block 710. The flow continues at block 710.

At block 710, the wagering game machine receives player input indicating preference selection. In embodiments where the wagering game machine presents a selection preference menu, the player may indicate preference selection by selecting the appropriate checkbox (e.g. like or dislike), or by selecting a number (e.g. on a scale from one to ten) corresponding to their relative like or dislike of the wagering game element. The flow continues at block 712.

At block 712, the wagering game machine determines a modified wagering game based on the player input. For example, the player may provide input indicating the dislike of the card deck style in a video poker game. The wagering game machine may use this input to swap a new card deck style for the old card deck style that the player dislikes. Furthermore, the wagering game machine may be able to determine patterns in the player's preferences. For example, the player may have a pattern of liking bright color themes while they are winning, and disliking bright color themes while they are losing. The wagering game machine can evaluate the player's performance and modify the wagering game accordingly. The flow continues at block 714.

At block 714, the wagering game machine presents the modified wagering game. In some embodiments, the wagering game machine can modify (i.e. change) all aspects of the wagering game that the player dislikes. In other embodiments, the wagering game machine can modify the wagering game based on the wagering game elements that the player has indicated a preference for. For example, the player can indicate a preference for larger slot reel symbols. In turn, the wagering game machine can modify all wagering game elements to be larger (e.g., the credit meter, spin button, etc.).

While FIG. 7 is a flow diagram illustrating sample operations for determining player preferences, FIG. 8 is a flow diagram illustrating sample operations for determining and transmitting player preferences.

FIG. 8 is a flow diagram illustrating operations for determining a player's wagering game preferences and transmitting the preferences, according to some embodiments of the inventive subject matter. The flow begins at block 802.

At block 802, the wagering game machine presents a wagering game. The flow continues at block 804.

At block 804, the wagering game machine presents wagering game elements for preference selection or preference indication. In some embodiments, every wagering game element is selectable. In other embodiments, only certain wagering game elements are selectable. For example, in a video poker game, only the card type, virtual table, and chip design may be selectable. In some embodiments, the wagering game elements that are selectable can be associated with indicium indicating that they are selectable. For example, the selectable wagering game elements can be associated with a symbol or other indicia indicating their selectability (e.g., blinking or brightly lit elements are selectable). The flow continues at block 806.

At block 806, the wagering game machine receives player input indicating the player's desire to enter a preference selection. In some embodiments, the wagering game machine has a touchscreen. In such embodiments, the player can indicate a desire to provide a preference selection by touching a wagering game element on the touchscreen. Additionally, the player may indicate a desire to enter preferences (e.g., like, dislike, etc.) by touching the touchscreen with a stylus or other instrument. In other embodiments, the wagering game machine can have a button (e.g., hard button or soft button on the touchscreen) that the player can select to indicate a desire to enter preference information. In some embodiments, activation of the button causes indicium or preference menus to appear in the wagering game. In some embodiments, when the button is activated, the wagering game can freeze or a screenshot of the wagering game can be taken in its current state. In some embodiments, the player input can indicate the player's preference, as opposed to indicating a desire to enter a preference selection. For example, player selection of a wagering game element may indicate that the player likes the wagering game element. In such embodiments, blocks 808 and 810 may not be necessary, and the flow would continue at block 812. In embodiments where a preference selection menu is presented, the flow continues at block 808.

At block 808, the wagering game machine presents a preference menu. In some embodiments, the preference menu can include only two options—like and dislike. In other embodiments, the preference menu can include a greater resolution or a scale upon which the player can rank their like (or relative dislike) for a wagering game element. For example, the preference menu may include a scale from one to ten, and the player can indicate the relative like or dislike of the wagering game element on the scale from one to ten. In some embodiments, the scale can have fewer than or greater than ten increments. In some embodiments, the preference menu can include only one option. For example, the preference menu may only include an option to like the wagering game element. In some embodiments, the presentation of a preference menu is not necessary. In such embodiments, the flow can skip block 808 and proceed directly to block 810. The flow continues at block 810.

At block 810, the wagering game machine receives player input indicating preference selection. In embodiments where the wagering game machine presents a selection preference menu, the player can indicate preference selection by selecting the appropriate checkbox (e.g. like or dislike), or by selecting a number (e.g. on a scale from one to ten) corresponding to their relative like or dislike of the wagering game element. The flow continues at block 812.

At block 812, the wagering game machine transmits the preference selection data. In some embodiments, the wagering game machine transmits the preference selection data to a wagering game server for aggregation. The wagering game machine can transmit preference selection data pertaining to a single player or more than one player. For example, the wagering game machine can transmit the preference selection data in real time as a player indicates preference selection. Alternatively, the wagering game machine can transmit the preference selection data at the conclusion of a wagering game session. In some embodiments, the wagering game machine can collect and transmit preference selection data from a number of players playing the same or a similar wagering game.

While FIGS. 7 and 8 are flow diagrams illustrating sample operations for determining player preferences, FIG. 9 is a flow diagram illustrating sample operations for customizing a wagering game.

FIG. 9 is a flow diagram illustrating operations for customizing a wagering game based on player preferences, according to some embodiments of the inventive subject matter. The flow begins at block 902.

At block 902, a wagering game server receives preference selection data. The preference selection data can be received in real time from a wagering game machine, or can be transmitted at the conclusion of each wagering game session by the wagering game machine. The flow continues at block 904.

At block 904, the wagering game server aggregates the preference selection data. In some embodiments, the aggregation can be specific to an individual player, a single wagering game presented on a single wagering game machine, a single wagering game presented on a plurality of wagering game machines, a group of similar wagering games presented on a single wagering game machine, a group of similar wagering games presented on a plurality of wagering game machines, etc. The flow continues at block 906.

At block 906, the wagering game server determines relevant preference selection. In some embodiments, the wagering game server can determine what preference selections are relevant to a specific player. For example, a player may have made several preference selections regarding slot reel symbols. The wagering game server may determine that the player prefers a certain theme of slot reel symbols. In some embodiments, the wagering game server can analyze the preference selections to determine what wagering game elements (e.g., color themes, volatility, wagering game element placement, wagering game gameplay speed, etc.) generate the greatest profits for the casino. For example, the wagering game server may determine that wagering games having a certain color theme, gameplay speed, volatility, etc. correlate to longer wagering game sessions. The flow continues at block 908.

At block 908, the wagering game server customizes the wagering game(s) based on the relevant preference selections. For example, at bock 906, the wagering game server may have determined that the typical player prefers a certain color theme or volatility. Accordingly, the wagering game server can customize the wagering game include these aspects. Alternatively, at block 906, the wagering game server may have determined that a specific player prefers a blue color theme. Accordingly, the wagering game server can customize the wagering game to include a blue color theme. Alternatively, at block 906, the wagering game server may have determined that a certain gameplay speed produces the greatest profits for the casino. Accordingly, the wagering game server can customize the wagering game(s) presented on the wagering game machines to correspond to that gameplay speed.

Figure 10:
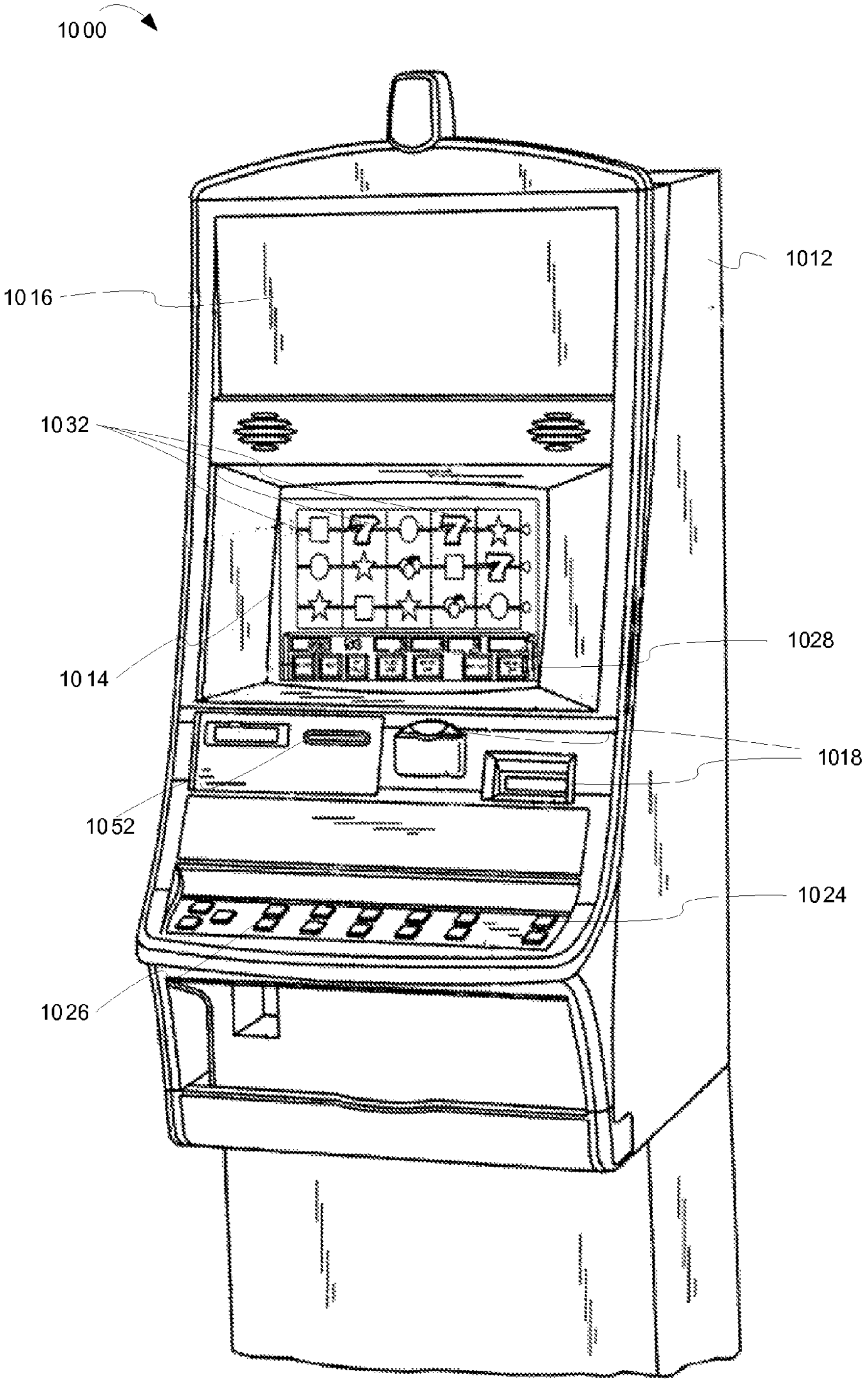
FIG. 10 depicts a perspective view of a wagering game machine 1000, according to some embodiments of the inventive subject matter.

While FIG. 9 is a flow diagram illustrating sample operations for customizing a wagering game, FIG. 10 depicts a perspective view of a wagering game machine Although examples refer to indicating a player preference for specific wagering game elements, in some embodiments, a player can indicate a preference for a series of wagering game events. For example, a player a can indicate that they liked the last hand in a poker game, the last several minutes of a poker game (or other wagering game), etc. For example, if a player indicates that they liked the last five minutes (or last five handle pulls, etc.) of an electronic slot game, the wagering game system can analyze the last five minutes (last five handle pulls, etc.) of the wagering game and determine the relevant wagering game attributes that they player liked during that time period. In some embodiments, the wagering game system can then modify the wagering game to include those attributes.

Although examples refer to a player indicating a preference for their own wagering gameplay, in some embodiments, in a multi-player wagering game, a player can indicate a preference for the wagering gameplay of others. For example, in a multi-player poker game, a player can indicate that they liked the way a second player played a hand (or last several hands). In some embodiments, this player preference can be private (i.e., viewable only to the player indicating the preference). In other embodiments, this player preference may be public (i.e., viewable by people other than the player indicating the preference). Additionally, in some embodiments, a player can like another player's entire wagering game session.

Although examples refer to player selection via touch input by the player's fingertip, in some embodiments, the touch input can be communicated by an instrument other than the player's fingertip. For example, a player may be able to provide touch input by use of a stylus. In some embodiments, the stylus may be in wireless communication with the wagering game machine, and communicate player tracking information to the wagering game machine.

Example Wagering Game Machines

FIG. 10 depicts a perspective view of a wagering game machine, according to example embodiments of the invention. In some embodiments, the player can indicate a preference (e.g., like, dislike, etc.) for wagering game elements on the wagering game machine 1000. Referring to FIG. 10, a wagering game machine 1000 is used in gaming establishments, such as casinos. According to embodiments, the wagering game machine 1000 can be any type of wagering game machine and can have varying structures and methods of operation. For example, the wagering game machine 1000 can be an electromechanical wagering game machine configured to play mechanical slots, or it can be an electronic wagering game machine configured to play video casino games, such as blackjack, slots, keno, poker, blackjack, roulette, etc.

The wagering game machine 1000 comprises a housing 1012 and includes input devices, including value input devices 1018 and a player input device 1024. For output, the wagering game machine 1000 includes a primary display 1014 for displaying information about a basic wagering game. The primary display 1014 can also display information about a bonus wagering game and a progressive wagering game. The wagering game machine 1000 also includes a secondary display 1016 for displaying wagering game events, wagering game outcomes, and/or signage information. While some components of the wagering game machine 1000 are described herein, numerous other elements can exist and can be used in any number or combination to create varying forms of the wagering game machine 1000.

The value input devices 1018 can take any suitable form and can be located on the front of the housing 1012. The value input devices 1018 can receive currency and/or credits inserted by a player. The value input devices 1018 can include coin acceptors for receiving coin currency and bill acceptors for receiving paper currency. Furthermore, the value input devices 1018 can include ticket readers or barcode scanners for reading information stored on vouchers, cards, or other tangible portable storage devices. The vouchers or cards can authorize access to central accounts, which can transfer money to the wagering game machine 1000.

The player input device 1024 comprises a plurality of push buttons on a button panel 1026 for operating the wagering game machine 1000. In addition, or alternatively, the player input device 1024 can comprise a touch screen 1028 mounted over the primary display 1014 and/or secondary display 1016.

The various components of the wagering game machine 1000 can be connected directly to, or contained within, the housing 1012. Alternatively, some of the wagering game machine's components can be located outside of the housing 1012, while being communicatively coupled with the wagering game machine 1000 using any suitable wired or wireless communication technology.

The operation of the basic wagering game can be displayed to the player on the primary display 1014. The primary display 1014 can also display a bonus game associated with the basic wagering game. The primary display 1014 can include a cathode ray tube (CRT), a high resolution liquid crystal display (LCD), a plasma display, light emitting diodes (LEDs), or any other type of display suitable for use in the wagering game machine 1000. Alternatively, the primary display 1014 can include a number of mechanical reels to display the outcome. In FIG. 10, the wagering game machine 1000 is an "upright" version in which the primary display 1014 is oriented vertically relative to the player. Alternatively, the wagering game machine can be a "slant-top" version in which the primary display 1014 is slanted at about a thirty-degree angle toward the player of the wagering game machine 1000. In yet another embodiment, the wagering game machine 1000 can exhibit any suitable form factor, such as a free standing model, bartop model, mobile handheld model, or workstation console model.

A player begins playing a basic wagering game by making a wager via the value input device 1018. The player can initiate play by using the player input device's buttons or touch screen 1028. The basic game can include arranging a plurality of symbols along a payline 1032, which indicates one or more outcomes of the basic game. Such outcomes can be randomly selected in response to player input. At least one of the outcomes, which can include any variation or combination of symbols, can trigger a bonus game.

In some embodiments, the wagering game machine 1000 can also include an information reader 1052, which can include a card reader, ticket reader, bar code scanner, RFID transceiver, or computer readable storage medium interface. In some embodiments, the information reader 1052 can be used to award complimentary services, restore game assets, track player habits, etc.

Figure 11:
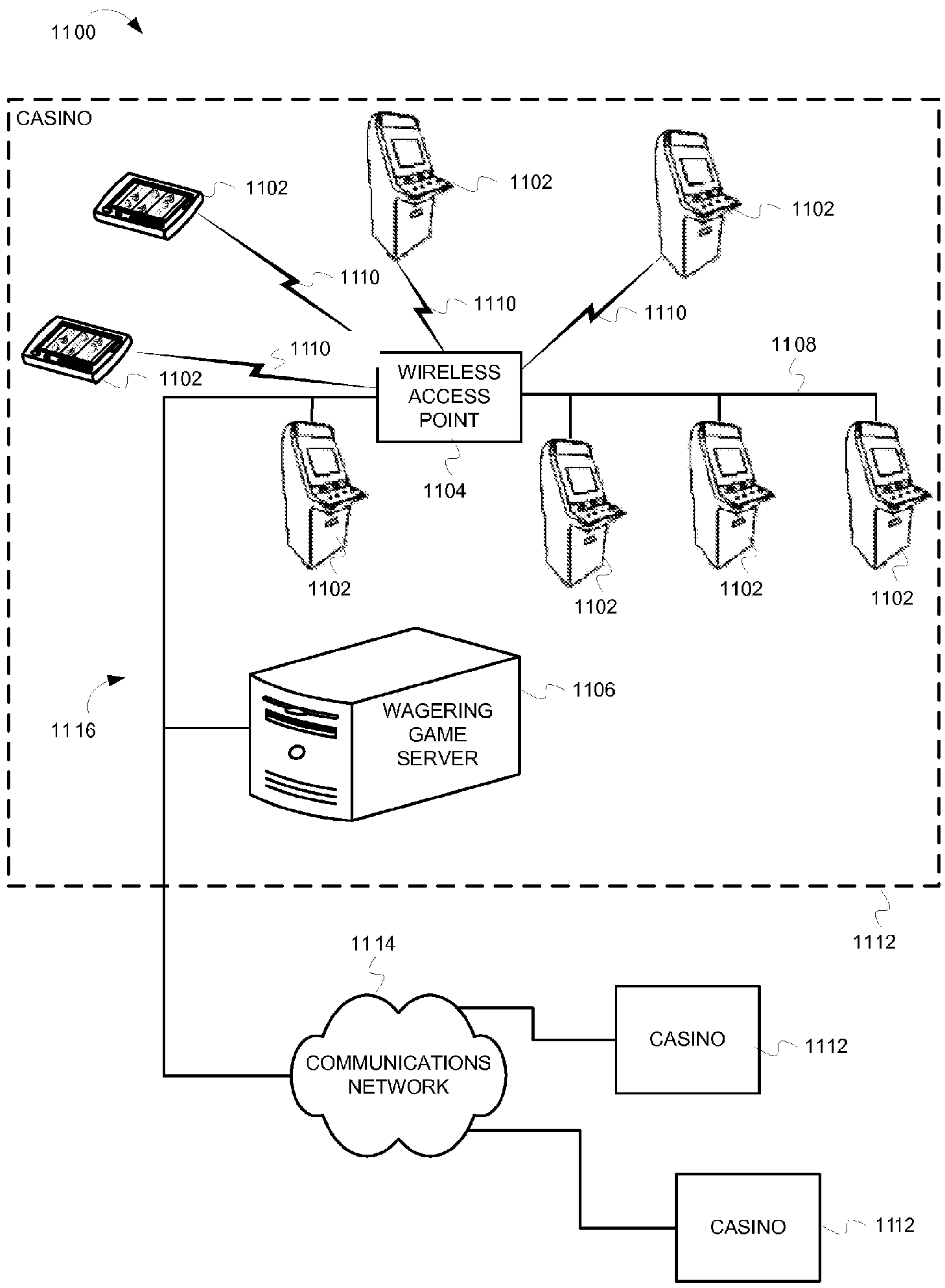
FIG. 11 is a block diagram illustrating a wagering game network 1100, according to example embodiments of the invention.

While FIG. 10 depicts an example wagering game machine, FIG. 11 is a block diagram illustrating a wagering game network.

Wagering Game Networks

FIG. 11 is a block diagram illustrating a wagering game network 1100, according to example embodiments of the invention. As shown in FIG. 11, the wagering game network 1100 includes a plurality of casinos 112 connected to a communications network 1114.

Each casino 1112 includes a local area network 1116, which includes an access point 1104, a wagering game server 1106, and wagering game machines 1102. The access point 1104 provides wireless communication links 1110 and wired communication links 1108. The wired and wireless communication links can employ any suitable connection technology, such as Bluetooth, 802.11, Ethernet, public switched telephone networks, SONET, etc. In some embodiments, the wagering game server 1106 can serve wagering games and distribute content to devices located in other casinos 1112 or at other locations on the communications network 1114.

The wagering game machines 1102 described herein can take any suitable form, such as floor standing models, bartop models, workstation-type console models, etc. In some embodiments, the player may utilize a mobile device to provide input indicating preference selection. In one embodiment, the wagering game network 1100 can include other network devices, such as accounting servers, wide area progressive servers, player tracking servers, and/or other devices suitable for use in connection with embodiments of the invention.

In some embodiments, wagering game machines 1102 and wagering game servers 1106 work together such that a wagering game machine 1102 can be operated as a thin, thick, or intermediate client. For example, one or more elements of game play may be controlled by the wagering game machine 1102 (client) or the wagering game server 1106 (server). Game play elements can include executable game code, lookup tables, configuration files, game outcome, audio or visual representations of the game, game assets or the like. In a thin-client example, the wagering game server 1106 can perform functions such as determining game outcome or managing assets, while the wagering game machine 1102 can present a graphical representation of such outcome or asset modification to the user (e.g., player). In a thick-client example, the wagering game machines 1102 can determine game outcomes and communicate the outcomes to the wagering game server 1106 for recording or managing a player's account.

In some embodiments, either the wagering game machines 1102 (client) or the wagering game server 1106 can provide functionality that is not directly related to game play. For example, account transactions and account rules may be managed centrally (e.g., by the wagering game server 1106) or locally (e.g., by the wagering game machine 1102). Other functionality not directly related to game play may include power management, presentation of advertising, software or firmware updates, system quality or security checks, etc.

Any of the wagering game network components (e.g., the wagering game machines 1102) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

presenting, on a display device of an electronic wagering game machine, a wagering game including wagering game elements that are generated by the electronic wagering game machine, wherein the electronic wagering game machine comprises one or more electronic input devices configured to detect a physical item associated with a monetary value that establishes a credit balance and to receive a cashout input that initiates a payout from the credit balance, wherein the credit balance changes based on play of the wagering game;

detecting, via input received at the electronic wagering game machine player, selection of one or more of the wagering game elements during play of the wagering game, wherein the player selection of the one or more of the wagering game elements indicates player liking for the one or more of the wagering game elements;

determining, by a data analyzer of the electronic wagering game machine based on the player selection of the one or more of the wagering game elements, player preferences for the wagering game; and modifying, by a game customization unit of the electronic wagering game machine, the wagering game based on the player preferences.

2. The method of claim 1, further comprising:

suspending the wagering game, wherein the player selection occurs during suspension of the wagering game.

3. The method of claim 1, wherein the modifying the wagering game includes changing one or more of slot reels, a color theme, playing card design, a credit meter, a bet indicator, wagering game audio, volatility, gameplay speed, and wagering game theme.

4. The method of claim 1, wherein the player selection is detected on a mobile device, and further comprising:

presenting, at least in part on the mobile device, the wagering game including the one or more wagering game elements.

5. The method of claim 1, wherein the player selection is detected by stylus input, wherein the stylus is associated with a player account, and wherein the player's selections are recorded in the player account.

6. The method of claim 1, further comprising:

initiating a wagering game session;

storing information about the wagering game session, wherein the information about the wagering game session can be used to recreate the wagering game session; and presenting a recreation of the wagering game session, including the one or more wagering game elements for selection.

7. The method of claim 6, wherein the recreation of the wagering game session includes presenting a screenshot of the wagering game, and wherein the one or more wagering game elements are selectable from the screenshot of the wagering game.

8. A method comprising:

presenting, on a display device of an electronic wagering game machine, a wagering game including wagering game elements, wherein the electronic wagering game machine comprises one or more electronic input devices configured to detect a physical item associated with a monetary value that establishes a credit balance and to receive a cashout input that initiates a payout from the credit balance, wherein the credit balance changes based on play of the wagering game;

detecting, via input received at the electronic wagering game machine, selection of one of the wagering game elements;

in response to the detecting selection of the one of the wagering game elements, presenting a graphical user interface in association with the one of the wagering game elements, wherein the graphical user interface is configured to receive player input during play of the wagering game, wherein the player input indicates one of a liking for the one of the wagering game elements and a disliking for the one of the wagering game elements; and detecting, via the wagering game machine, the player input.

9. The method of claim 8, further comprising:

modifying the wagering game, wherein the modifying is based, at least in part, on the one of the liking for the one of the wagering game elements and a disliking for the one of the wagering game elements; and presenting the wagering game.

10. The method of claim 8, further comprising:

transmitting, for aggregation, the one of the liking for the one of the wagering game elements and the disliking for the one of the wagering game elements.

11. The method of claim 8, wherein the graphical user interface provides a scale of preference, and wherein a player can indicate the player's degree of preference on the scale of preference.

12. The method of claim 8, wherein the wagering game elements that are selectable are indicated by visual indicia.

13. The method of claim 8, the player input constitutes preference data and further comprising:

aggregating the preference data for a plurality of players;

compiling the preference data for the plurality of players into a graphical heat map; and presenting the graphical heat map of the preference data for the plurality of players on a display device.

14. A wagering game machine comprising:

at least one processor;

a display device;

one or more electronic input devices configured to:

detect a physical item associated with a monetary value that establishes a credit balance, and receive a cashout input that initiates a payout from the credit balance, wherein the credit balance changes based on play of a wagering game; and a computer readable storage medium having computer usable code executable on the at least one processor, the computer useable program code including;

code to present, on the display device of a wagering game machine, the wagering game, wherein the wagering game includes wagering game elements; and code to detect, during play of the wagering game on the wagering game machine, player input, wherein the player input indicates a preference for one of the wagering game elements.

15. The apparatus of claim 14, wherein the wagering game elements are one or more of slot reels, a background color, playing card design, a credit meter, a bet indicator, a wagering game audio icon, a wagering volatility icon, a gameplay speed icon, and a wagering game theme icon.

16. The apparatus of claim 14, the computer useable program code further including:

code to present a preference selection menu associated with the one of the wagering game elements on the wagering game machine in response to the player input selecting the one of the wagering game elements, wherein the preference selection menu provides a scale of preference, and wherein a player can indicate the player's degree of preference on the scale of preference.

17. The apparatus of claim 14, the computer useable program code further including:

code to store information about the wagering game, wherein the information about the wagering game can be used to recreate the wagering game; and code to present a recreation of the wagering game, including the wagering game elements for selection after the wagering game.

18. A wagering game machine comprising:

at least one processor;

one or more electronic input devices configured to:

detect a physical item associated with a monetary value that establishes a credit balance, and receive a cashout input that initiates a payout from the credit balance, wherein the credit balance changes based on play of a wagering game; and a computer readable storage medium having computer usable code executable on the at least one processor, the computer usable program code including code to;

present, at a wagering game machine, a wagering game including wagering game elements;

detect player selection of one or more of the wagering game elements during play of the wagering game, wherein the player selection of the one or more of the wagering game elements indicates player liking for the one or more of the wagering game elements;

transmit, via a communications network to a wagering game server, an indication of the player liking for the one or more of the wagering game elements;

receive, at the wagering game machine from the wagering game server, player preferences for the wagering game based on the player liking for the one or more of the wagering game elements; and modify the wagering game based on the player preferences.

19. The apparatus of claim 18, wherein the one or more of the wagering game elements are one or more of slot reels, a color theme, playing card design, a credit meter, a bet indicator, wagering game audio, wagering volatility, gameplay speed, and wagering game theme.

20. The apparatus of claim 18, wherein the player selection is detected via a mobile device, the computer usable program code further including code to:

present, at least in part on the mobile device, the wagering game including the one or more wagering game elements.

21. The apparatus of claim 18, the computer usable program code further including code to:

initiate a wagering game session;

store information about the wagering game session, wherein the information about the wagering game session can be used to recreate the wagering game session; and present a recreation of the wagering game session, including the one or more wagering game elements for selection.

22. One or more non-transitory machine-readable storage media, having instructions stored therein, which, when executed by one or more processors causes the one or more processors to perform operations that comprise:

presenting, on a wagering game machine, a wagering game including wagering game elements, wherein the wagering game machine includes one or more electronic input devices configured to detect a physical item associated with a monetary value that establishes a credit balance and to receive a cashout input that initiates a payout from the credit balance, wherein the credit balance changes based on play of the wagering game;

detecting selection of one of the wagering game elements;

in response to the detecting selection of the one of the wagering game elements, presenting a graphical user interface in association with the one of the wagering game elements, wherein the graphical user interface is configured to receive player input during play of the wagering game, wherein the player input indicates one of a liking for the one of the wagering game elements and a disliking for the one of the wagering game elements; and detecting the player input.

23. The one or more non-transitory machine-readable storage media of claim 22, wherein the operations further comprise:

modifying the wagering game, wherein the modifying is based, at least in part, on the one of the liking for the one of the wagering game elements and a disliking for the one of the wagering game elements; and presenting the wagering game.

24. The one or more non-transitory machine-readable storage media of claim 22, wherein the operations further comprise:

transmitting, for aggregation, the one of the liking for the one of the wagering game elements and the disliking for the one of the wagering game elements.

25. The one or more non-transitory machine-readable storage media of claim 22, the player input constitutes preference data, and wherein the operations further comprise:

aggregating the preference data for a plurality of players;

compiling the preference data for the plurality of players into a graphical heat map; and presenting the graphical heat map of the preference data for the plurality of players on a display device.

* * * * *